(12) United States Patent
Hatta

(10) Patent No.: US 11,491,746 B2
(45) Date of Patent: Nov. 8, 2022

(54) METHOD FOR MANUFACTURING FIBER REINFORCED RESIN MOLDED ARTICLE, AND MANUFACTURING DEVICE THEREOF

(71) Applicant: TOYOTA JIDOSHA KABUSHIKI KAISHA, Toyota (JP)

(72) Inventor: Ken Hatta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 41 days.

(21) Appl. No.: 17/122,596

(22) Filed: Dec. 15, 2020

(65) Prior Publication Data

US 2021/0221076 A1 Jul. 22, 2021

(30) Foreign Application Priority Data

Jan. 21, 2020 (JP) .............................. JP2020-007350

(51) Int. Cl.
| | |
|---|---|
| *B29C 70/48* | (2006.01) |
| *B29C 70/54* | (2006.01) |
| *B29C 45/02* | (2006.01) |
| *B29C 45/77* | (2006.01) |
| *B29C 45/14* | (2006.01) |
| *B29L 31/00* | (2006.01) |

(52) U.S. Cl.
CPC .............. *B29C 70/48* (2013.01); *B29C 45/02* (2013.01); *B29C 45/14786* (2013.01); *B29C 45/77* (2013.01); *B29C 70/546* (2013.01); *B29C 2945/76006* (2013.01); *B29L 2031/7156* (2013.01)

(58) Field of Classification Search
CPC .......... B29C 2045/0039; B29C 45/561; B29C 2045/0089; B29C 33/303; B29C 33/304; B29C 33/76; B29C 70/462; B29C 70/48
See application file for complete search history.

(56) References Cited

U.S. PATENT DOCUMENTS

| | | | | |
|---|---|---|---|---|
| 6,063,315 A | * | 5/2000 | Keller | ................... B29C 66/54 264/572 |
| 2008/0264551 A1 | * | 10/2008 | Wood | ................ B29C 45/14786 156/172 |
| 2015/0048546 A1 | | 2/2015 | Yamamoto et al. | |
| 2019/0084249 A1 | | 3/2019 | Hatta | |
| 2019/0389104 A1 | * | 12/2019 | Heikkila | ........... B29C 45/14786 |
| 2021/0101351 A1 | * | 4/2021 | Bland | .................... B29C 70/48 |

FOREIGN PATENT DOCUMENTS

| | | |
|---|---|---|
| CN | 109532057 A | 3/2019 |
| JP | H01-242219 A | 9/1989 |
| JP | H 06254895 A | 9/1994 |
| JP | 2005-219240 A | 8/2005 |
| JP | 2019-056415 A | 4/2019 |
| WO | WO2013/125641 A1 | 8/2013 |

* cited by examiner

*Primary Examiner* — Matthew J Daniels
(74) *Attorney, Agent, or Firm* — Finnegan, Henderson, Farabow, Garrett & Dunner, LLP

(57) ABSTRACT

Provided is a method for manufacturing a fiber reinforced resin molded article capable of effectively suppressing formation of a weld line, and such a manufacturing device thereof. Even with multiple gates (resin inlets), resin is poured from a second gate (second resin inlet) when resin flow is detected at the second gate (second resin inlet), and then the resin poured from a first gate (first resin inlet) and the resin poured from the second gate (second resin inlet) are made smoothly meet.

7 Claims, 13 Drawing Sheets

METHOD FOR MANUFACTURING FIBER REINFORCED RESIN MOLDED ARTICLE, AND MANUFACTURING DEVICE THEREOF

CROSS REFERENCE TO RELATED APPLICATIONS

The present application claims priority from Japanese patent application JP 2020-007350 filed on Jan. 21, 2020, the entire content of which is hereby incorporated by reference into this application.

BACKGROUND

Technical Field

The present disclosure relates to methods for manufacturing fiber reinforced resin molded articles, such as a high-pressure tank that is reinforced with fibers, and manufacturing devices thereof.

Background Art

Fuel cell vehicles include a high-pressure tank (hereinafter, simply may be called a tank) that stores fuel gas such as natural gas or hydrogen gas. Such a high-pressure tank is prepared as a fiber reinforced resin molded article that includes a hollow liner having a gas barrier property as a core member, and carbon fiber reinforced plastic or glass fiber reinforced plastic (hereinafter collectively called a fiber reinforced resin layer) that coats the liner. For lightweight, a hollow container made of resin is typically used as the liner.

High-pressure tanks have been conventionally manufactured by the filament winding (FW) method and the resin transfer molding (RTM) method. JP 2019-056415 A, for example, discloses a method for manufacturing a high-pressure tank by the RTM method. This manufacturing method places a preform in a mold, the preform including a liner defining the inner space of the high-pressure tank and a fiber layer formed on the outer surface of the liner, and rotates the preform in the mold in the circumferential direction about the central axis of the preform while injecting resin from a gate toward the preform placed in the mold.

SUMMARY

In the manufacturing method by the RTM method, resin may be injected (poured) toward the preform in the mold from a single gate (at one point) (hereinafter this may be called a resin inlet). However, when the resin is poured from the single gate, it is difficult to uniformly charge the resin over the entire preform. Then, multiple gates may be provided and configured to be opened or closed at different timings (for example, JP H01-242219 A, WO 2013/125641 A1). However, simply providing multiple gates may cause a weld line to be formed at a resin meeting portion, leading to low quality of the tank.

In view of the above problems, the present disclosure provides a method for manufacturing a fiber reinforced resin molded article capable of effectively suppressing the formation of a weld line, and such a manufacturing device thereof.

According to one aspect of the present disclosure, there is disclosed a method for manufacturing a fiber reinforced resin molded article to form a preform including a fiber layer on an outer surface of a liner, impregnate the fiber layer of the preform with resin, and cure the resin, and the method includes: a step of preparing a mold including a first resin inlet, a second resin inlet, and a detecting unit for detecting resin flow inside of the mold; a step of placing the preform in the mold; a step of pouring resin from the first resin inlet into the mold; and a step of pouring resin from the second resin inlet into the mold when the detecting unit detects that the resin poured from the first resin inlet has reached the second resin inlet and allowing the resin poured from the first resin inlet and the resin poured from the second resin inlet to meet.

In some embodiments, the detecting unit includes a pressure sensor configured to detect pressure of resin flowing in the mold.

In some embodiments, the first resin inlet is located at a position closer to a center of the preform as compared to the second resin inlet.

In some embodiments, an injection direction of the resin at the second resin inlet is inclined in a direction from the first resin inlet toward the second resin inlet.

In some embodiments, resin is supplied to the first resin inlet and the second resin inlet from a common resin injector.

In some embodiments, resin is supplied to the first resin inlet and the second resin inlet from separate resin injectors, respectively.

In some embodiments, the mold includes a first mold and a second mold; in the step of placing the preform in the mold, the preform is placed between the first mold and the second mold so as to define a first gap between the first mold and the preform and a second gap between the second mold and the preform, the second gap being larger than the first gap; and in the step of pouring resin from the first resin inlet into the mold and the step of pouring resin from the second resin inlet into the mold, the resin is poured toward the second gap in the mold, and the method further includes, after the step of pouring resin from the first resin inlet into the mold and the step of pouring resin from the second resin inlet into the mold, a step of bringing the second mold close to the preform for compressive filling with the resin in the mold.

According to another aspect of the present disclosure, there is disclosed a device for manufacturing a fiber reinforced resin molded article to form a preform including a fiber layer on an outer surface of a liner, impregnate the fiber layer of the preform with resin, and cure the resin, and the device includes: a mold including a first resin inlet, a second resin inlet, and a detecting unit for detecting resin flow inside of the mold; a driving mechanism configured to drive the mold in an opening direction and a closing direction; a first resin pouring mechanism configured to pour resin from the first resin inlet into the mold; a second resin pouring mechanism configured to pour resin from the second resin inlet into the mold; and a control device configured to obtain detection information from the detecting unit and control operating states of the driving mechanism, the first resin pouring mechanism, and the second resin pouring mechanism, the control device being configured to control the driving mechanism to place the preform in the mold; control the first resin pouring mechanism to pour resin from the first resin inlet into the mold; and control the second resin pouring mechanism to pour resin from the second resin inlet into the mold when the detecting unit detects that the resin poured from the first resin inlet has reached the second resin inlet and allow the resin poured from the first resin inlet and the resin poured from the second resin inlet to meet.

In some embodiments, the detecting unit includes a pressure sensor configured to detect pressure of resin flowing in the mold.

In some embodiments, the first resin inlet is located at a position closer to a center of the preform as compared to the second resin inlet.

In some embodiments, an injection direction of the resin at the second resin inlet is inclined in a direction from the first resin inlet toward the second resin inlet.

In some embodiments, resin is supplied to the first resin inlet and the second resin inlet from a common resin injector.

In some embodiments, resin is supplied to the first resin inlet and the second resin inlet from separate resin injectors, respectively.

In some embodiments, the mold includes a first mold and a second mold; and the control device is configured to, when placing the preform in the mold, control the driving mechanism to place the preform between the first mold and the second mold so as to define a first gap between the first mold and the preform and a second gap between the second mold and the preform, the second gap being larger than the first gap; when pouring resin from the first resin inlet into the mold and pouring resin from the second resin inlet into the mold, pour the resin toward the second gap in the mold; and after pouring resin from the first resin inlet into the mold and pouring resin from the second resin inlet into the mold, control the driving mechanism to bring the second mold close to the preform for compressive filling with the resin in the mold.

According to one aspect of the present disclosure, resin is poured from the second resin inlet when the resin flow is detected at the second resin inlet, and then the resin poured from the first resin inlet and the resin poured from the second resin inlet are made smoothly meet, so even with multiple resin inlets, the present disclosure can reduce the meeting angle of the resin to prevent a weld line.

DETAILED DESCRIPTION

The following describes embodiments of the present disclosure, with reference to the attached drawings.

First Embodiment

The following describes a high-pressure tank for fuel cell vehicles that is one example of a fiber reinforced resin molded article. The fiber reinforced resin molded article, to which the present disclosure is applied, is not limited to the high-pressure tank for fuel cell vehicles. The shape, the material, etc. of the liner and the preform of the fiber reinforced resin molded article are also not limited to the illustrated example.

The RTM method wraps (winds) carbon fiber around a liner multiple times (in multiple layers) to form a preform with a fiber layer on the outer surface of the liner, impregnates the fiber layer of the preform with epoxy resin, and cures the epoxy resin. In this way, the RTM method manufactures a high-pressure tank for fuel cell vehicles including a fiber reinforced resin layer including the carbon fiber and the epoxy resin on the outer periphery of the liner. The liner is a hollow container made of resin (for example, nylon resin) that defines the inner space of the high-pressure tank.

In such a high-pressure tank for fuel cell vehicle, the carbon fiber is laminated thickly, and so the resin hardly enters into the inner layer of the carbon fiber. That is, the high-pressure tank for fuel cell vehicles has the carbon fiber that is laminated very thickly (about 10 times that of a typical RTM molded shell, exterior component) to keep enough strength, and it is difficult to impregnate the fiber with resin. Simple tank rotation as in JP 2019-056415 A does not exert a good effect of resin impregnation into the inner layer of the carbon fiber. When resin is poured into the inner layer of the carbon fiber for impregnation at high pressure, the pressure does not distribute uniformly, so that the quality and performance of the tank will deteriorate, such as deformation of the resin liner inside of the tank at a partially high-pressure part.

The tank has a cylindrical shape, and so it is hard to uniformly charge resin entirely, making the resin impregnation uninform. In addition, since the high-pressure tank has a long resin flow length, it is hard to charge resin from a single gate, and it is hard to uniformly charge and impregnate resin over the entire tank unless multiple gates are provided. However, providing multiple gates may cause a weld line to be formed at a resin meeting portion, leading to low performance of the tank.

To avoid this, the present embodiment has the following configuration.

[Manufacturing Device of High-Pressure Tank]

Figure 1:
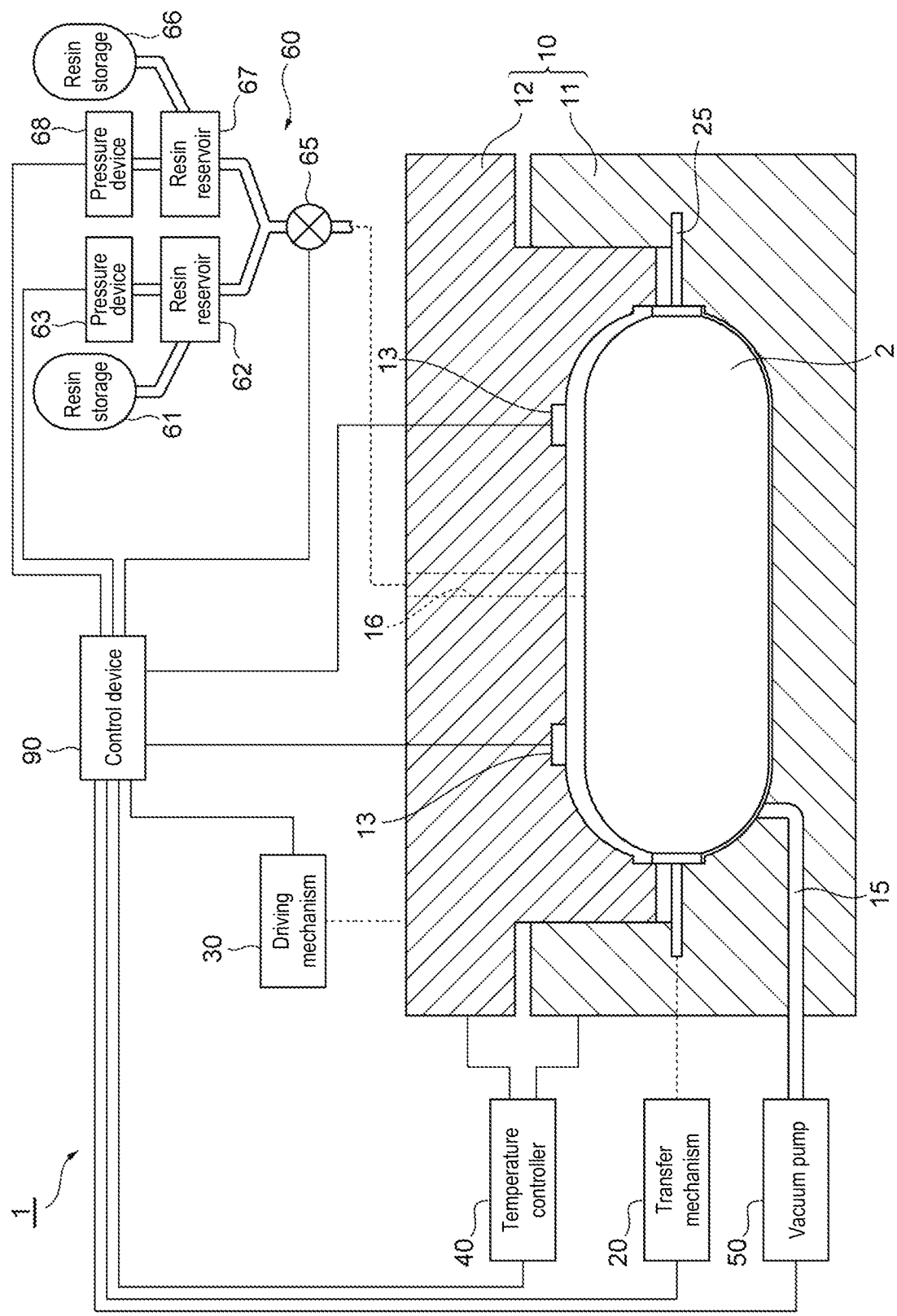
FIG. 1 is a vertical cross-sectional view of a manufacturing device of a high-pressure tank (fiber reinforced resin molded article) according to a first embodiment.
Figure 2:
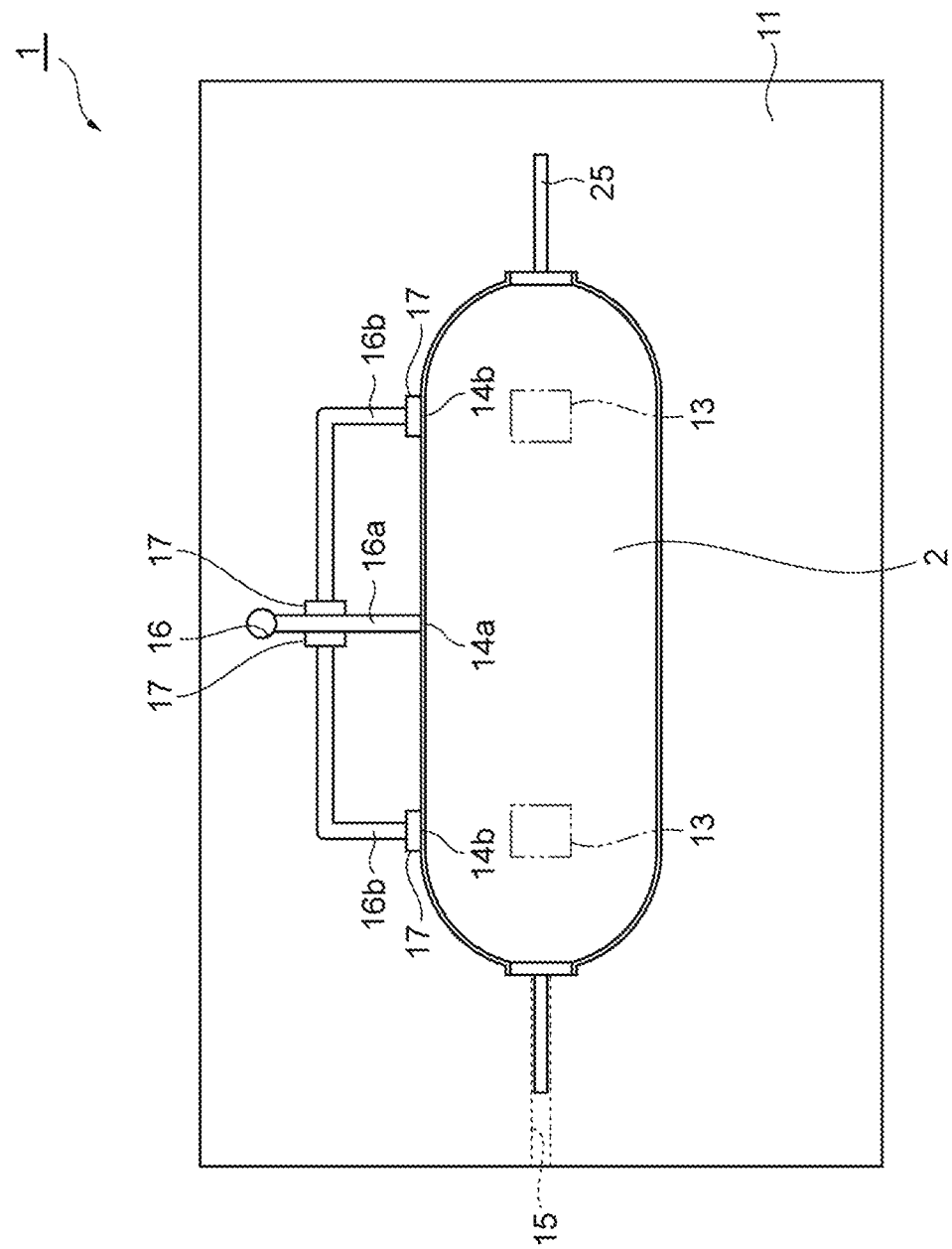
FIG. 2 is a top view of a lower mold of the manufacturing device of a high-pressure tank (fiber reinforced resin molded article), in which an upper mold is removed, according to the first embodiment.

FIG. 1 and FIG. 2 show a manufacturing device of a high-pressure tank that is one example of a fiber reinforced resin molded article according to a first embodiment. FIG. 1 is a vertical cross-sectional view and FIG. 2 is a top view of a lower mold in which an upper mold is removed.

A preform 2 as an intermediate body of the high-pressure tank to be manufactured in the present embodiment includes a liner and a fiber layer formed on the outer surface of the liner to be integrated with the liner. The liner is a resin hollow container having a gas barrier property and defining an inner space of the high-pressure tank. In one example, the fiber layer has a thickness of about 10 mm to 30 mm. The fiber layer is formed by wrapping fibers around the outer surface of the liner multiple times by the filament winding method.

Examples of the fiber wound around the liner include carbon fiber, glass fiber, and aramid fiber. The fibers may include continuous fibers, or include long fibers or short fibers. As described later, the fiber (layer) wound around the liner is impregnated with resin and cured to form a fiber reinforced resin layer that coats the periphery of the liner. Examples of the resin include thermosetting resins, such as epoxy resins, unsaturated polyester resins, and polyamide resins, and thermoplastic resins, such as polyethylene resins and polyester resins.

Figure 5:
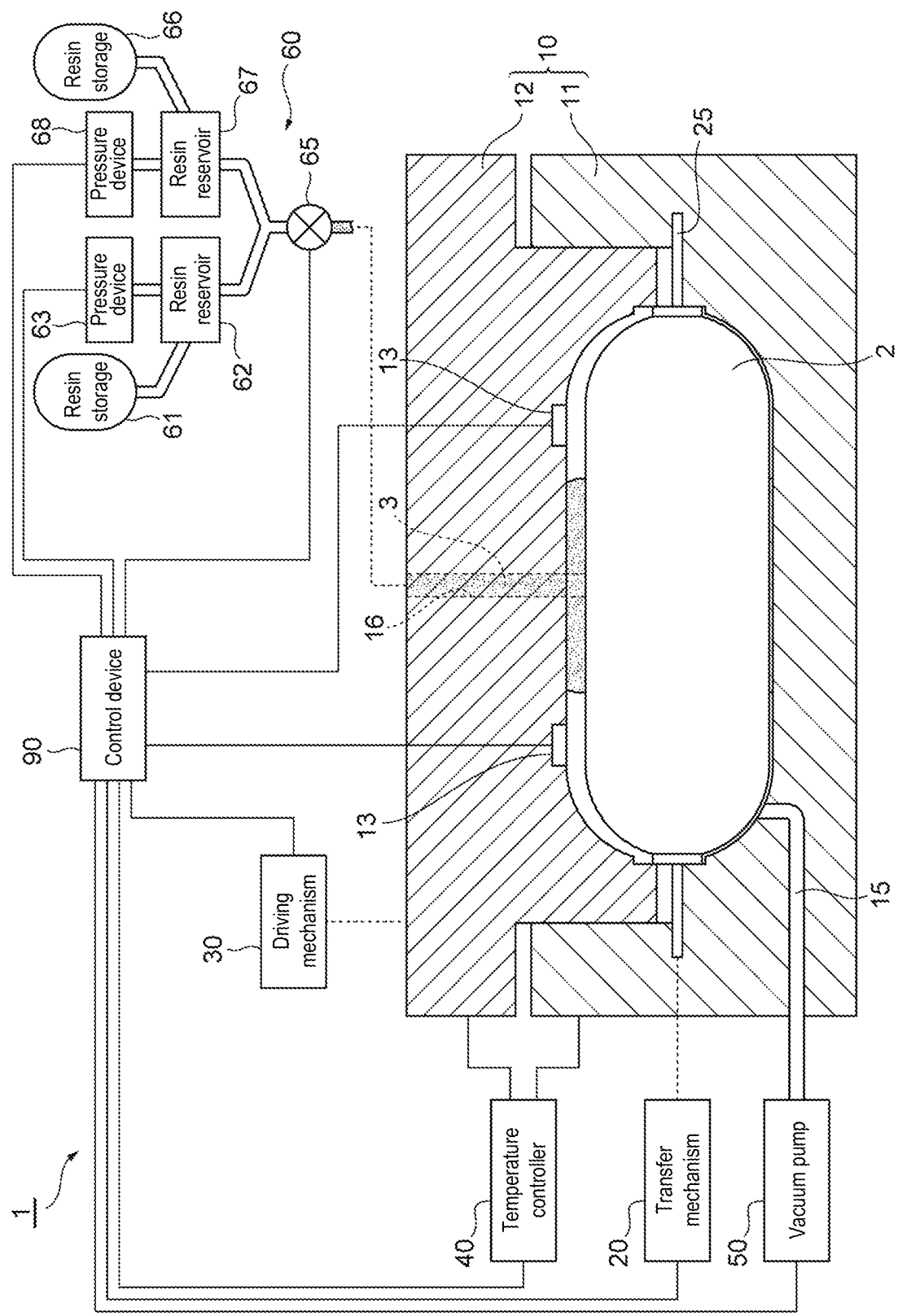
FIG. 5 is a vertical cross-sectional view of the manufacturing device of a high-pressure tank, showing a first resin pouring step while open/close gate cores are closed (first gate: open, second gate: closed) according to the first embodiment.

The manufacturing device 1 is configured to manufacture a high-pressure tank by the RTM method to impregnate the fiber layer making up the preform 2 with resin 3 (reference numeral is shown in FIG. 5, for example) and cure the impregnated resin 3.

In one example, the manufacturing device 1 includes a mold 10 made up of a plurality of molds, such as a lower mold 11 as a fixed mold and an upper mold 12 as a moving mold. Closing of these lower mold 11 and upper mold 12 (this may be called mold clamping) defines a cavity for the fiber reinforced resin layer. To place the preform 2 having the lamination of fiber in the mold 10, the cavity of the mold 10 is made larger by the tolerance of the preform 2, for example.

This embodiment includes the lower mold 11 as a fixed mold and the upper mold 12 as a moving mold (a mold that is movable relative to the fixed mold). In another embodiment, the upper mold 12 may be a fixed mold and the lower mold 11 may be a moving mold, or both of the lower mold 11 and the upper mold 12 may be movable. The mold 10 in this embodiment includes two parts of the lower mold 11 and the upper mold 12, which may be three or more of parts.

In the mold 10, the preform 2 is supported by a shaft 25 that is disposed along the axis of the liner. That is, the shaft 25 constitutes a support mechanism that supports the preform 2 in the mold 10 (in the cavity).

A vacuum degassing pipe 15 is embedded in the mold 10 (in the lower mold 11 in the illustrated example). The vacuum degassing pipe 15 connects to a vacuum pump 50. The vacuum pump 50 operates to degas (evacuate) the mold 10 (the cavity) via the vacuum degassing pipe 15. That is, the vacuum pump 50 and the vacuum degassing pipe 15 constitute a vacuum degassing mechanism for vacuum degas of the mold 10 (the cavity).

A resin pouring pipe (this may be called a resin pouring gate) 16 is embedded in the mold 10. The resin pouring pipe 16 connects to a resin injector 60. The resin injector 60 pours (supplies) resin 3 into the mold 10 (cavity) (via gates 14a, 14b, which will be described later) through the resin pouring pipe 16 (described in detail later). In one example, the resin 3 is a two-component thermosetting epoxy resin composed of a base resin and a curing agent. The resin injector 60 therefore includes a resin storage 61, a resin reservoir 62, and a pressure device 63 for the base resin, a resin storage 66, a resin reservoir 67, and a pressure device 68 for the curing agent, and a valve 65 to supply the resin 3, which is a mixture of the base resin and the curing agent, to the resin pouring pipe 16.

In this example, the resin pouring pipe 16 extends from the upper mold 12 toward the lower mold 11. As shown in FIG. 2, the lower mold 11 is provided with a runner 16a, which forms a first gate (first resin inlet) 14a that is open to the cavity, and (a pair of) branch runners 16b, which form second gates (second resin inlets) 14b that are open to the cavity, so as to be continuous to the resin pouring pipe 16. In this example, the first gate 14a is at a position facing a central portion (in the axial direction) of the preform 2. The (pair of) branch runners 16b branch from the runner 16a toward the opposite end portions of the preform 2 (liner) in the axial direction. In this example, the second gates 14b are at positions facing the opposite end portions of the preform 2 (in the axial direction).

End portions of the branch runners 16b (i.e., branch portions from the runner 16a and the nearest portions of the second gates 14b) are provided with open/close gate cores 17.

When the open/close gate cores 17 are closed, the flow of the resin 3 from the runner 16a to the branch runners 16b is blocked, and the resin 3 flowing through the resin pouring pipe 16 flows only through the runner 16a. This allows the resin injector 60 to pour (supply) the resin 3 through the resin pouring pipe 16 and the runner 16a into the mold 10 (into the cavity) from (only) the first gate 14a at the center. That is, the resin injector 60, the resin pouring pipe 16, and the runner 16a constitute a primary resin pouring mechanism (first resin pouring mechanism) for pouring the resin 3 into the mold 10 (into the cavity).

Meanwhile, when the open/close gate cores 17 are open, the runner 16a and the branch runners 16b communicate with each other, and the resin 3 flowing through the resin pouring pipe 16 flows through the runner 16a, and part of the resin 3 flowing through the runner 16a flows into the branch runners 16b. In addition, the branch runners 16b and the mold 10 (the cavity) communicate with each other. This allows the resin injector 60 to pour (supply) the resin 3 through the resin pouring pipe 16 and the runner 16a into the mold 10 (into the cavity) from the first gate 14a at the center, and also allows the resin injector 60 to pour (supply) the resin 3 into the mold 10 (in the cavity) through the resin pouring pipe 16 and the branch runners 16b from the second gates 14b at the opposite ends. That is, the resin injector 60, the resin pouring pipe 16, and the branch runners 16b constitute a secondary resin pouring mechanism (second resin pouring mechanism) for pouring the resin 3 into the mold 10 (into the cavity).

That is, in the present embodiment, the resin 3 is supplied to the first gate 14a at the center and the second gates 14b at the opposite ends through the common resin pouring pipe 16 (resin injector 60).

Pressure sensors 13 are embedded in the mold 10 (in the upper mold 12 in the illustrated example). In this example, the pressure sensors 13 are located at the positions facing the opposite end portions of the preform 2 (in the axial direction) in the upper mold 12, that is, at the positions corresponding to the second gates 14b (in the axial direction of the liner). The pressure sensors 13 detect the resin flow at the positions corresponding to the second gates 14b in the mold 10, and thus detect pressure of the resin 3 flowing through the positions corresponding to the second gates 14b in the mold 10. Pressure information (resin pressure) obtained by the pressure sensors 13 is input to the control device 90, which will be described later. The control device 90 can detect the resin flow at the positions corresponding to the second gates 14b in the mold 10 on the basis of the pressure information (resin pressure) obtained by the pressure sensors 13. The control device 90, for example, detects that the resin 3 (specifically, the resin 3 poured from the first gate 14a into the mold 10) has flowed through (reached) the positions corresponding to the second gates 14b in the mold 10 when the pressure of the resin 3 obtained by the pressure sensors 13 exceeds a predetermined threshold. The control device 90 also controls the open/closed state of the open/close gate cores 17 on the basis of the detection result.

It should be noted that it is desirable that the pressure sensors 13 are disposed in the vicinity of the second gates 14b to precisely detect that the resin 3 has flowed through (reached) the positions corresponding to the second gates 14b in the mold 10 (in the cavity).

In this example, the pressure sensors 13 are used as detecting units for detecting the resin flow in the mold 10, but may also be used as detecting units such as a deformation sensor or a temperature sensor.

The manufacturing device 1 includes: a transfer mechanism 20 to transfer the preform 2 to a predetermined position; a driving mechanism 30 to drive the mold 10 (specifically, the upper mold 12) in the direction to open and close the mold (vertical direction); a temperature controller 40 to control the temperature of the mold 10 (lower mold 11, upper mold 12); and a control device 90 as a controller to control the operating state of the entire manufacturing device 1 (specifically, the operating states of the transport mechanism 20, the driving mechanism 30, the temperature controller 40, the vacuum pump 50 in the vacuum degassing mechanism, the pressure devices 63 and 68 and the valve 65 of the resin injector 60 in the primary resin pouring mechanism, and the open/close gate cores 17 provided for the branch runners 16b in the secondary resin pouring mechanism).

[Method for Manufacturing a High-Pressure Tank]

Figure 3:
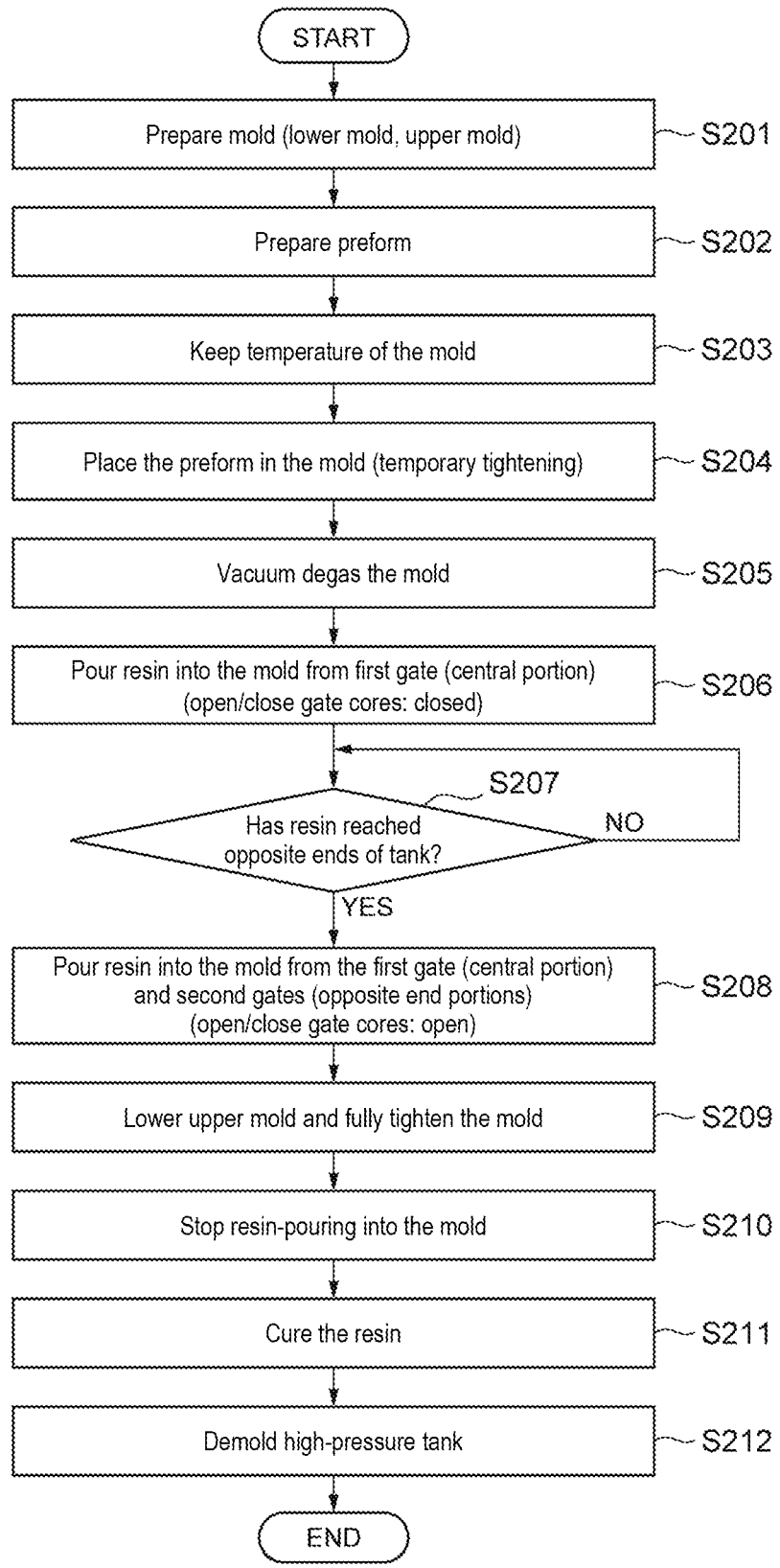
FIG. 3 is a flowchart of a method for manufacturing a high-pressure tank (fiber reinforced resin molded article) according to the first embodiment.
Figure 6:
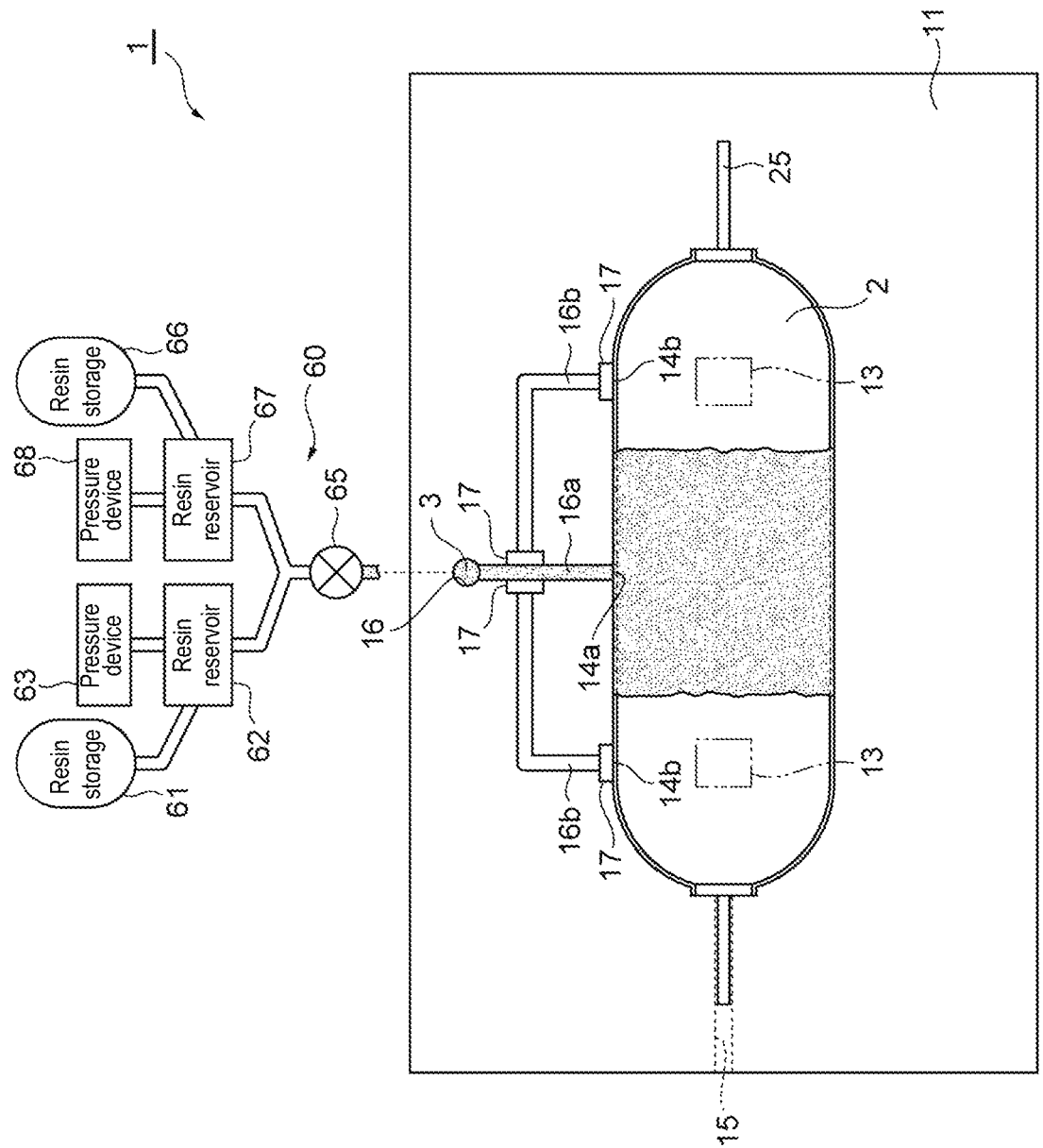
FIG. 6 is a top view of the lower mold of the manufacturing device of a high-pressure tank of FIG. 5, in which the upper mold is removed.
Figure 7:
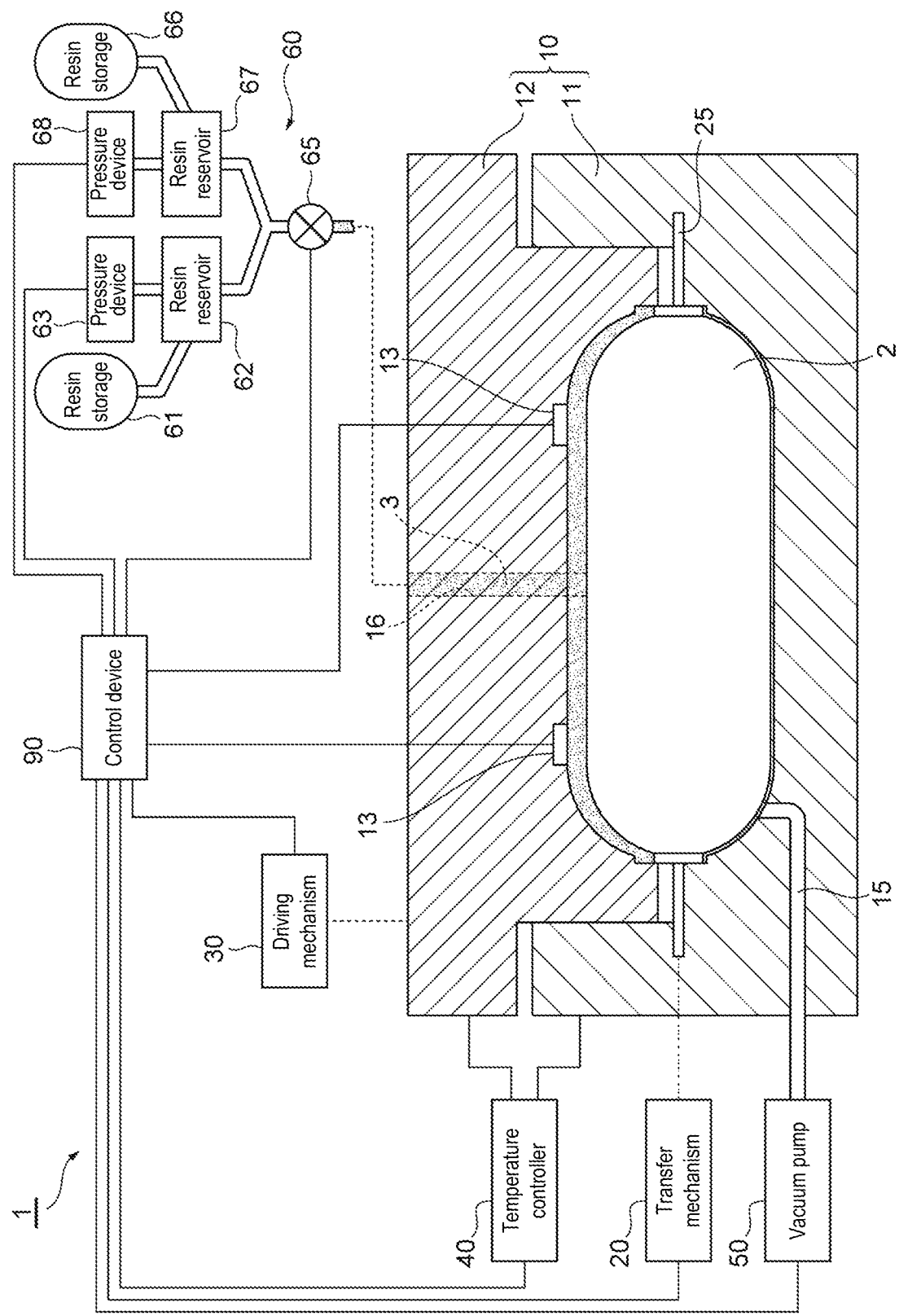
FIG. 7 is a vertical cross-sectional view of the manufacturing device of a high-pressure tank, showing a second resin pouring step while open/close gate cores are open (first gate: open, second gate: open) according to the first embodiment.
Figure 8:
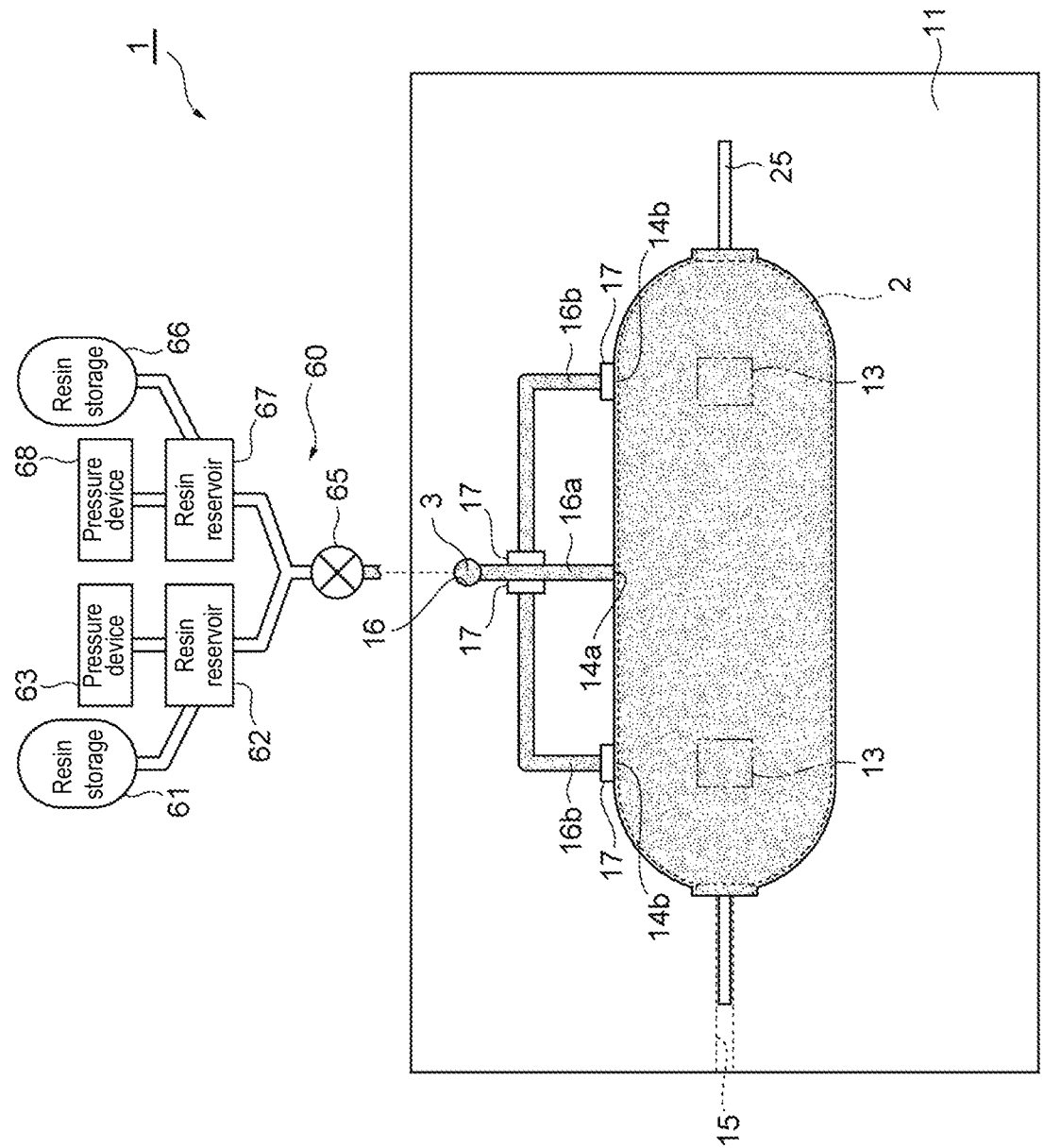
FIG. 8 is a top view of the lower mold of the manufacturing device of a high-pressure tank of FIG. 7, in which the upper mold is removed.

FIG. 3 is a flowchart illustrating a method for manufacturing a high-pressure tank that is an example of the fiber reinforced resin molded article according to the first embodiment. FIG. 4, FIG. 5, FIG. 7, and FIG. 9 are vertical cross-sectional views respectively showing a preform placing step and a vacuum degassing step; a first resin pouring step while open/close gate cores are closed (first gate: open, second gate: closed); a second resin pouring step while open/close gate cores are open (first gate: open, second gate: open); and a fully tightening step, a resin-pouring stop step, and a resin curing step, respectively. FIG. 6 and FIG. 8 are top views of the lower mold of FIG. 5 and FIG. 7, in which the upper mold is removed.

(Mold Preparation Step: S201)

Firstly, the method prepares the mold 10 including the lower mold 11 and the upper mold 12 having the above-described structure. As described above, the mold 10 includes the runner 16a having the first gate 14a, the branch runners 16b having the second gates 14b and the open/close gate cores 17, and the pressure sensors 13 as the detecting units for detecting the resin flow in the mold 10 (in the cavity), and the like.

(Preform Preparation Step: S202)

As described above, the method prepares the preform 2 beforehand, in which a fiber layer is formed by wrapping (winding) fiber around the outer surface of the liner.

(Mold Temperature-Retention Step: S203)

Next, the method makes the control device 90 control the temperature controller 40 so as to keep the temperature of the mold 10 (lower mold 11, upper mold 12) to a predetermined temperature. When the resin 3 is a thermosetting resin, this predetermined temperature is equal to or higher than the curing temperature of the resin 3.

The method in this example keeps the temperature of the mold 10 to be the curing temperature of the resin 3 or higher at the beginning. In another example, the temperature of the mold 10 may be kept to be less than the curing temperature of the resin 3 at the beginning, and at an appropriate timing in a step described later (e.g., after fully tightening of the mold 10), the temperature of the mold 10 may be kept to be the curing temperature or higher of the resin 3.

(Preform Placing Step: S204)

Figure 4:
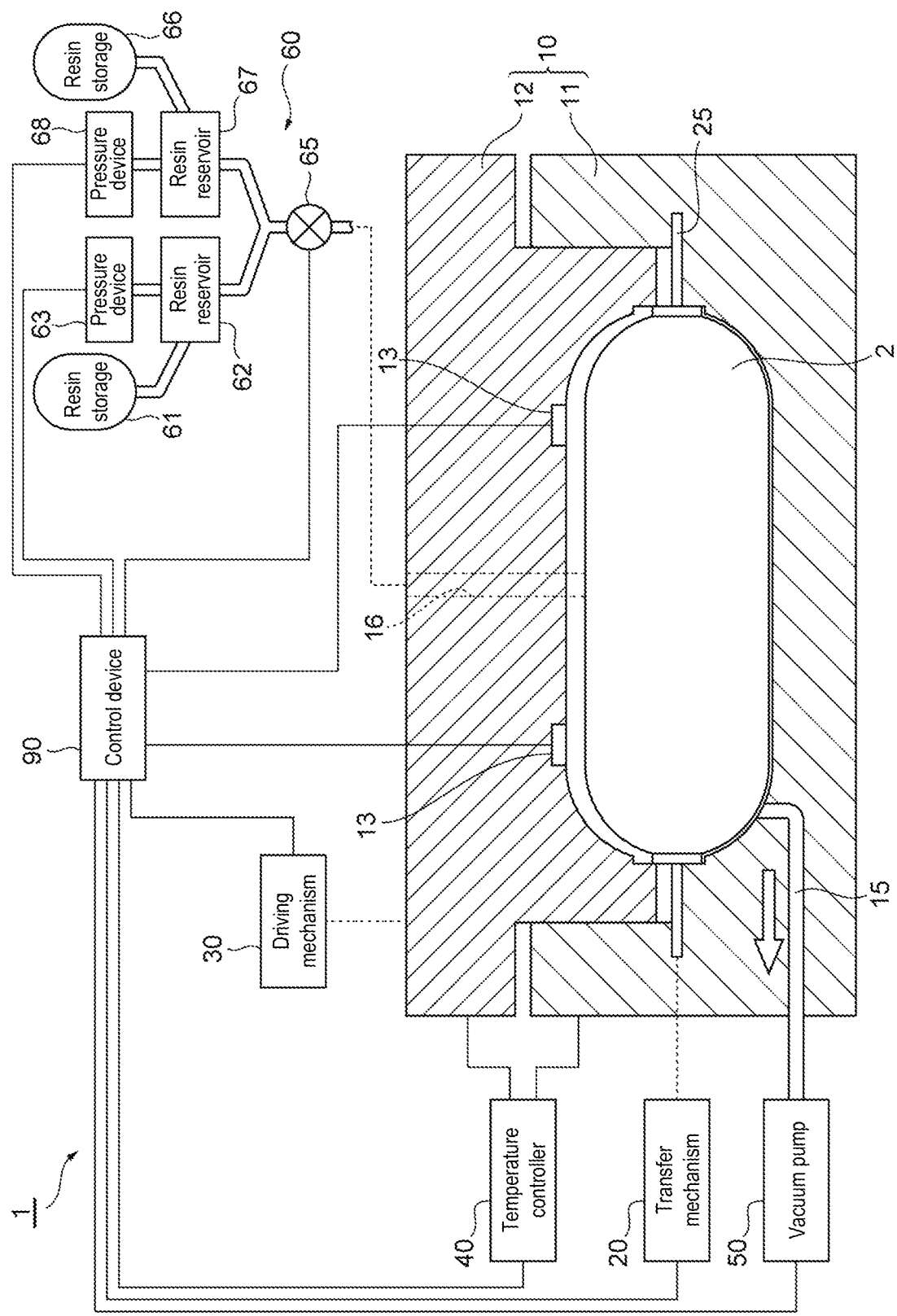
FIG. 4 is a vertical cross-sectional view of the manufacturing device of a high-pressure tank, showing a preform placing step and a vacuum degassing step according to the first embodiment.

Subsequently, the control device 90 controls the transfer mechanism 20 and the driving mechanism 30 to place the preform 2 in the mold 10 (that is, between the lower mold 11 and the upper mold 12) (FIG. 1, FIG. 4). Specifically, while opening the upper mold 12, the transfer mechanism 20 places the preform 2 on the lower mold 11 under the control of the control device 90. At this time, the shaft 25 supports the preform 2. After that, the driving mechanism 30 starts mold clamping under the control of the control device 90 and temporarily tightens the upper mold 12. Temporary tightening is an intermediate state between the state where the upper mold 12 is open and the fully tightening state, and the lower mold 11 and the upper mold 12 has a gap therebetween in the temporary tightening state. As shown in FIG. 4, the upper mold 12 moves to a position having a gap (second gap) of several mm with the preform 2. This gap (second gap) between the upper mold 12 and the preform 2 is larger than a gap (first gap) between the lower mold 11 and the preform 2.

(Vacuum Degassing Step: S205)

Next, the control device 90 controls the vacuum pump 50 while keeping the above-mentioned temporary tightening state (i.e., before completion of mold clamping) to degas the mold 10 (FIG. 4).

(First Resin Pouring Step while Open/Close Gate Cores are Closed (First Gate: Open, Second Gate: Closed): S206)

After stopping (or completion of) the above-stated vacuum degassing, the resin 3 is injected/poured into the mold 10 (FIG. 5, FIG. 6). Specifically, the control device 90 opens the valve 65, pressurizes the base resin stored in the resin reservoir 62 with the pressure device 63, and pressurizes the curing agent stored in the resin reservoir 67 with the pressure device 68 to mix the base resin and the curing agent and prepare (uncured) resin 3. At this time, the control device 90 controls the open/close gate cores 17 (corresponding to the second gates 14b) to be closed. This lets the (uncured) resin 3 flow through the resin pouring pipe 16 that extends from the upper mold 12 to the lower mold 11 while the open/close gate cores 17 are closed under the control of the control device 90, so that the resin 3 is injected/poured toward the preform 2 from the first gate 14a (in the illustrated example, the gate at the central portion of the preform 2) through the runner 16a. Since the upper mold 12 is temporarily tightened, the resin 3 is injected and poured mainly into the gap (second gap) between the upper mold 12 and the (upper face of) preform 2.

(Resin Reach Determination Step: S207)

Next, the method determines whether the resin 3 injected/poured into the mold 10 has reached the opposite ends of the tank. Specifically, the control device 90 determines whether the pressure of the resin 3 obtained by the pressure sensors 13 exceeds a predetermined threshold. If the pressure of the resin 3 obtained by the pressure sensors 13 exceeds a predetermined threshold, the control device 90 determines that the resin 3 injected/poured into the mold 10 has reached the opposite ends of the tank (i.e., the positions corresponding to the second gates 14b located at the opposite ends of the tank) (that is, the control device 90 detects that the resin 3 has flowed through the positions corresponding to the second gates 14b) (S207: Yes) and proceeds to the next step S208.

(Second Resin Pouring Step while Open/Close Gate Cores are Open (First Gate: Open, Second Gate: Open): S208)

If the control device 90 determines that the resin 3 injected/poured into the mold 10 has reached the opposite ends of the tank, the control device 90 controls the open/close gate cores 17 (corresponding to the second gates 14b) to be open. This lets the (uncured) resin 3 flow through the resin pouring pipe 16 that extends from the upper mold 12 to the lower mold 11 while the open/close gate cores 17 are open under the control of the control device 90, so that the resin 3 is injected/poured toward the preform 2 from the first gate 14a (in the illustrated example, the gate at the central portion of the preform 2) through the runner 16a, and also the resin 3 is injected/poured toward the preform 2 from the second gates (in the illustrated example, the gates at the opposite end portions of the preform 2) 14b through the branch runners 16b (which communicate with the runner 16a via the open/close gate cores 17) (FIG. 7, FIG. 8). At this time, the resin 3 poured from the first gate 14a and having reached the opposite ends of the tank (i.e., the positions corresponding to the second gates 14b located at the opposite ends of the tank) and the resin 3 poured from the second gates 14b meet (in the vicinity of the second gates 14b). Therefore, the method can control and reduce a resin meeting angle. Since the upper mold 12 is temporarily tightened also in this step, the resin 3 is injected and poured mainly into the gap (second gap) between the upper mold 12 and the (upper face of) preform 2.

(Fully Tightening Step: S209)

Figure 9:
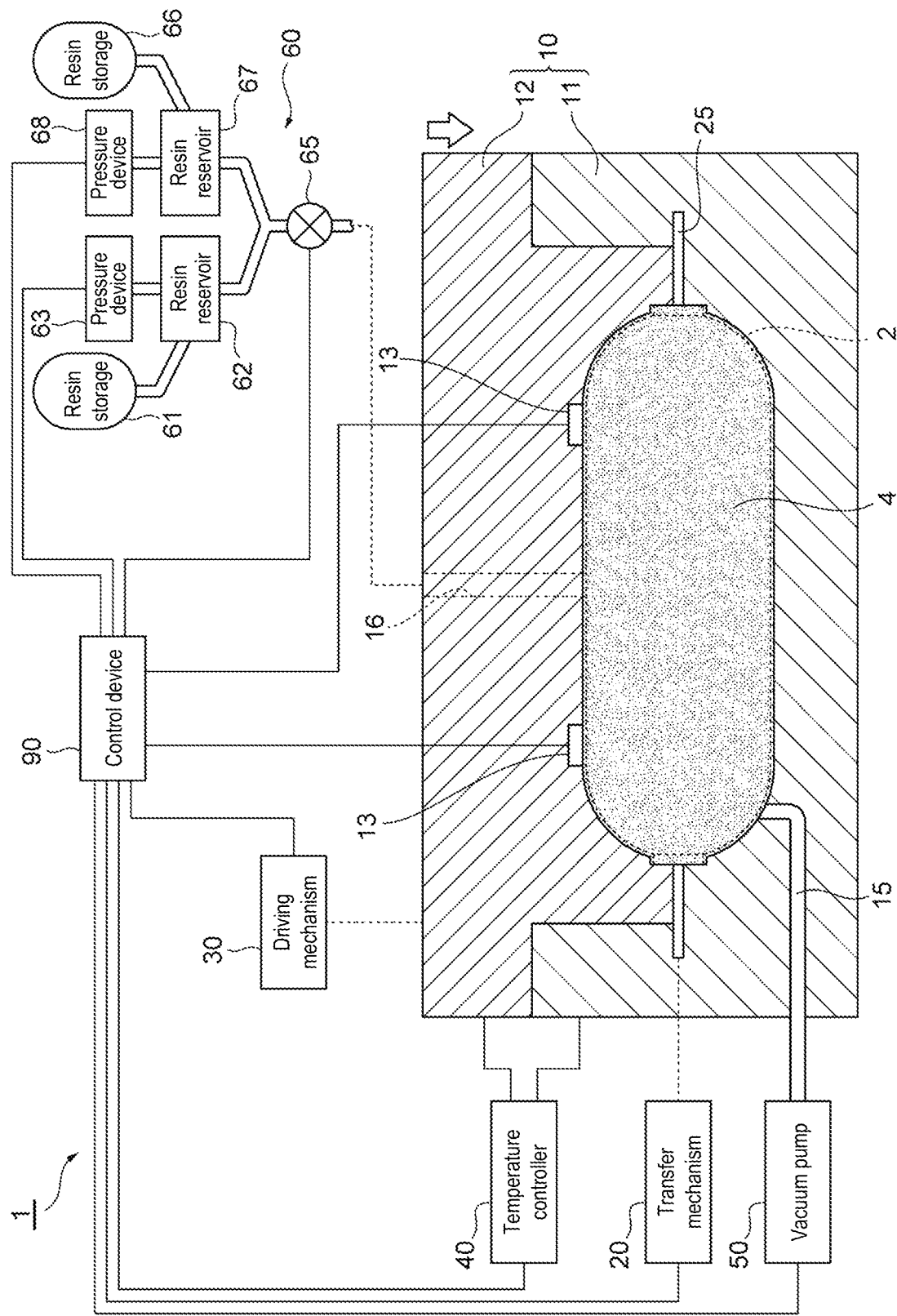
FIG. 9 is a vertical cross-sectional view of the manufacturing device of a high-pressure tank, showing a fully tightening step, a resin-pouring stop step, and a resin curing step according to the first embodiment.

After the charging of the resin 3 into the mold 10 ends, the control device 90 controls the driving mechanism 30 to lower the upper mold 12 to the lower end to completely close the mold (i.e., bring it closer to the preform 2) and completely close (fully tightening) the upper mold 12 and the lower mold 11 (FIG. 9). This keeps compressive filling with the resin 3 in the mold 10 uniform, and allows impregnation with the resin 3 in the lamination of the fiber layer of the preform 2.

(Resin-Pouring Stop Step: S210)

After the fiber layer is completely impregnated with the resin 3, the pouring of the resin 3 stops (FIG. 9).

(Resin Curing Step: S211)

After the pouring of the resin 3 stops as stated above, the method cures the resin 3 (FIG. 9).

(Demolding Step: S212)

After the resin 3 is cured, the control device 90 controls the driving mechanism 30 to open the upper mold 12. When the curing of the resin 3 ends, a high-pressure tank 4 having the fiber reinforced resin layer formed on the outer periphery of the liner is obtained.

As described above, when a high-pressure tank for fuel cell vehicles is manufactured by the RTM impregnation technology, pouring epoxy resin from multiple points over the tank that extends in the axial direction may cause a weld line to be formed during the resin flow, and critical quality problems leading to the degradation of the high-pressure tank performance, such as a low tank strength or occurrence of a void at a weld formation portion, may occur.

To greatly reduce the resin meeting angle of multiple gates and to reduce costs, the present embodiment injects the resin from a single gate and forms a gate that opens or closes at the runner through which the resin flows. At the same time, the present embodiment disposes the pressure sensors for detecting the resin flow in the mold to control the resin flow, so as to prevent formation of a weld line.

When placing the tank (preform 2) in the mold 10 and clamping the mold, a gap is kept between the lower mold 11 and the upper mold 12 to define a gap between the upper mold 12 and the tank (preform 2) to reduce the resin flow resistance during epoxy resin pouring, and only the first gate 14a of the runner 16a at the center of the tank is opened to make the resin flow from the center to the ends of the tank. At this time, if the pressure sensors 13 detect that the resin 3 has reached the ends of the tank, the second gates 14b at the opposite ends are opened to allow the resin 3 to meet, thereby reducing the resin meeting angle to suppress formation of a weld line. Thereafter, the upper mold 12 is closed and the inside of the tank is impregnated with the resin 3 under compression. In this manner, the present embodiment can prevent a weld line and reduce a void, and so can manufacture a product that ensures both the performance of the tank and the impregnation.

This distributes the pressure applied to the gates during resin pouring, and also enables uniform pressure applied to the entire tank. This also prevents defects such as a weld line at the resin meeting portion and a void caused by the resin meeting. This also improves the resin impregnation in the stacking direction (thickness direction) while optimizing the flow behavior in the mold 10. This also allows impregnation with the resin 3 while feedback-controlling the pressure behavior in the mold 10. Uniformly pressing in the stacking direction (thickness direction) improves the resin impregnation and the quality of the tank surface. This first embodiment is particularly effective when the length of the tank is relatively long, and only one resin injector is employed for cost reduction.

Therefore, when epoxy resin is impregnated by the RTM impregnation technology, the present embodiment can reduce a weld line and a void, and can also make the pressure over the entire tank uniform and low to impregnate the epoxy resin, and so can manufacture a tank that ensures both the performance of the tank and the impregnation.

As described above, according to the present embodiment, the resin 3 is poured from the second gates (second resin inlets) 14b when the resin flow is detected at the second gates (second resin inlets) 14b, and then the resin 3 poured from the first gate (first resin inlet) 14a and the resin 3 poured from the second gates (second resin inlets) 14b are made smoothly meet, so even with multiple gates (resin inlets), the present embodiment can reduce the meeting angle of the resin 3 to prevent a weld line.

Furthermore, since the first gate (first resin inlet) 14*a* and the second gates (second resin inlets) 14*b* commonly use one resin pouring pipe 16 (resin injector 60), the present embodiment can simplify facility.

Second Embodiment

The second embodiment is different from the above-described first embodiment only in the mechanism (primary resin pouring mechanism, secondary resin pouring mechanism) for pouring the resin 3 in the mold 10 (in the cavity). Thus, the same reference numeral is given to the portion having the same function as the first embodiment, and only the difference will be described.

In the above-described first embodiment, one resin injector 60 is used to supply the resin 3 to the first gate 14*a* at the center and the second gates 14*b* at the opposite ends through the common resin pouring pipe 16 (resin injector 60). In the second embodiment, multiple resin injectors are used to supply the resin 3 to the first gate 14*a* at the center and the second gates 14*b* at the opposite ends through separate resin pouring pipes (resin injectors), respectively.

[Manufacturing Device of High-Pressure Tank]

Figure 10:
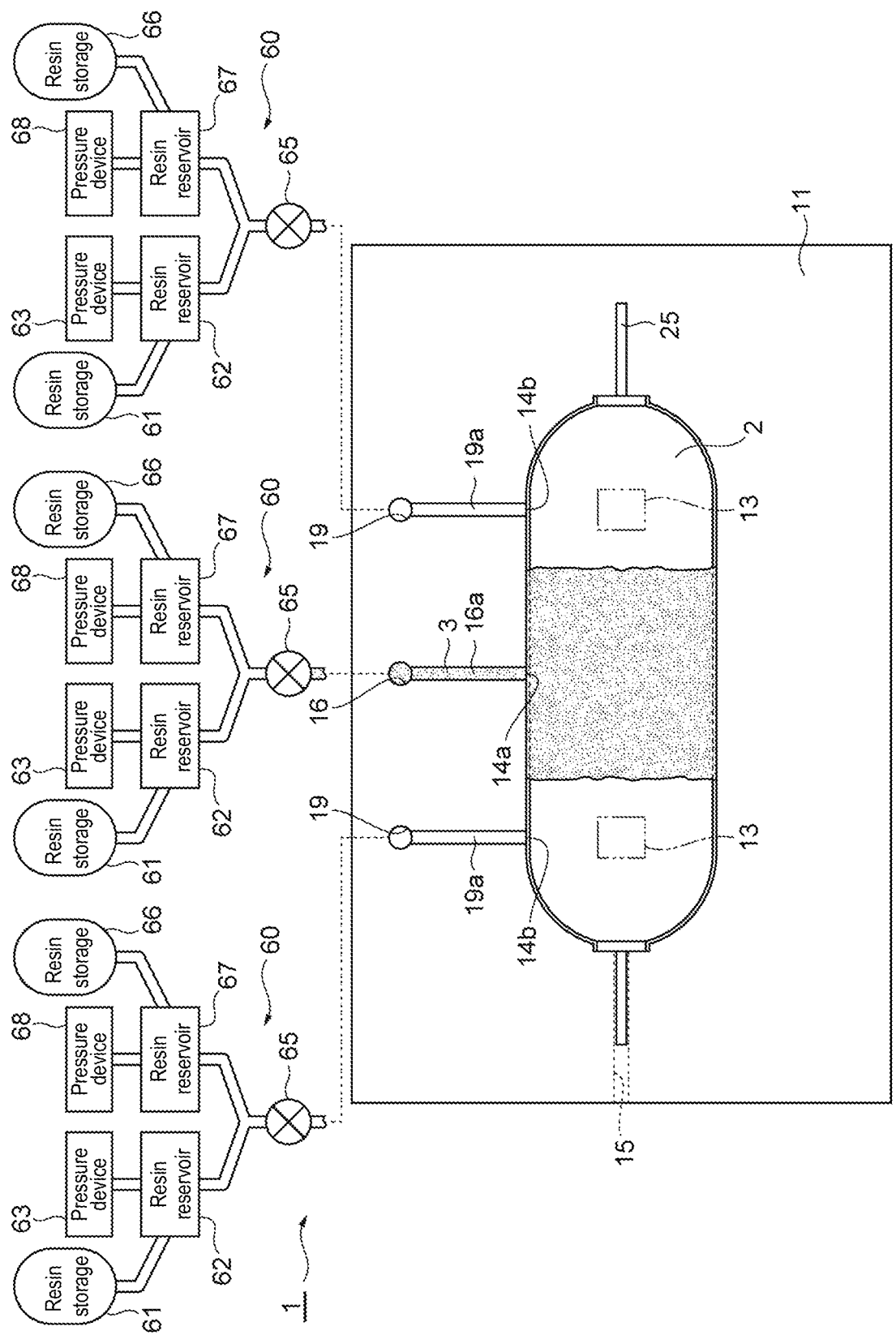
FIG. 10 is a top view of the lower mold of the manufacturing device of a high-pressure tank, in which the upper mold is removed, showing a first resin pouring step according to a second embodiment.
Figure 11:
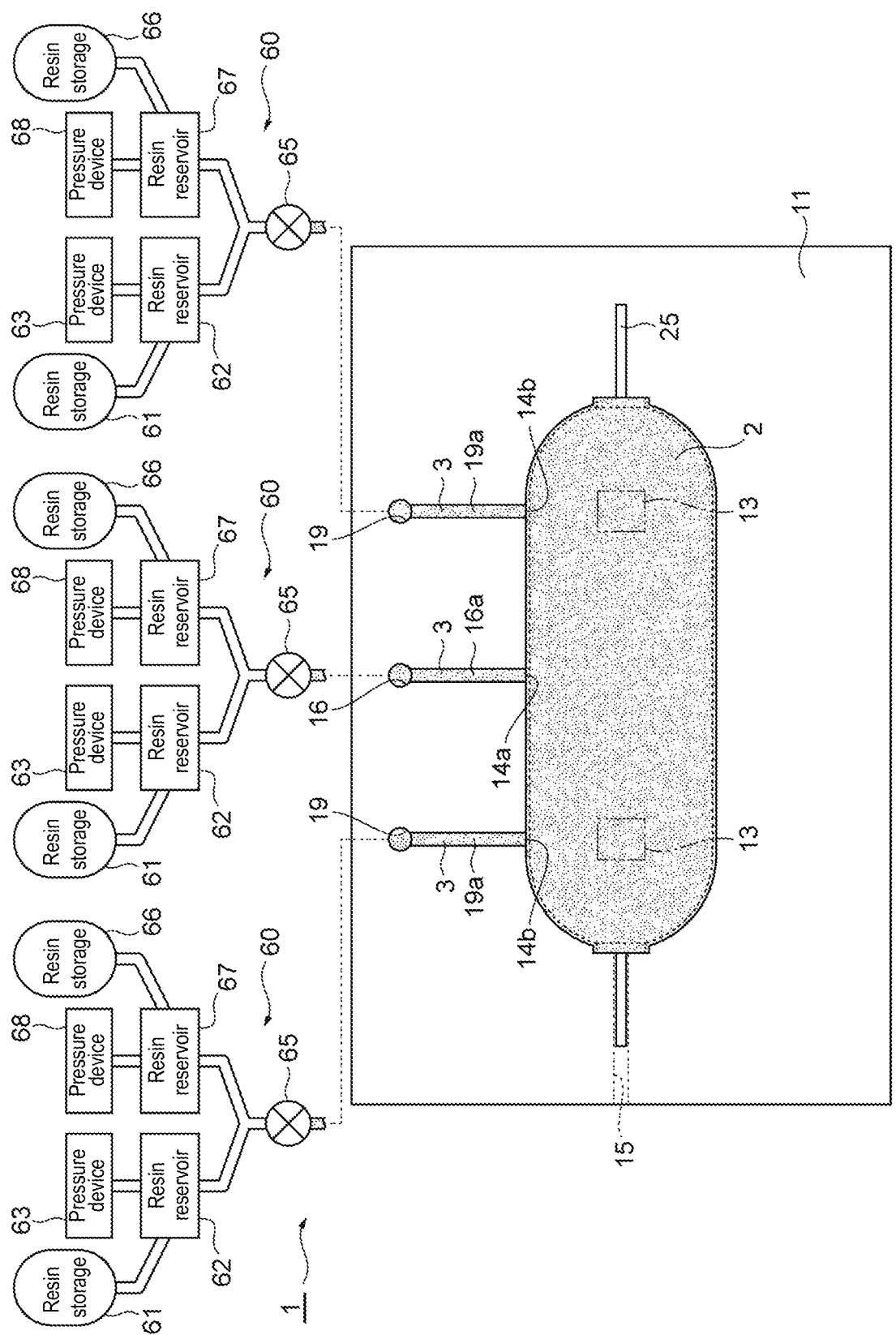
FIG. 11 is a top view of the lower mold of the manufacturing device of a high-pressure tank, in which the upper mold is removed, showing a second resin pouring step according to the second embodiment.

FIG. 10 and FIG. 11 are top views of the lower mold of the manufacturing device of a high-pressure tank, in which the upper mold is removed, according to a second embodiment. FIG. 10 shows a first resin pouring step and FIG. 11 shows a second resin pouring step.

A resin pouring pipe (this may be called a resin pouring gate) 16 is embedded in the mold 10. (A pair of) resin pouring pipes (this may be called resin pouring gates) 19 are also embedded in the mold 10 on the opposite sides of the resin pouring pipe 16. As shown in FIG. 10 and FIG. 11, the lower mold 11 is provided with a runner 16*a*, which forms a first gate (a gate at a position facing the central portion (in the axial direction) of the preform 2) 14*a* that is open to the cavity, so as to be continuous to the resin pouring pipe 16, and (a pair of) runners 19*a*, which form second gates (gates at positions facing the opposite ends of the preform 2 (in the axial direction)) 14*b* that are open to the cavity, so as to be continuous to the (pair of) resin pouring pipes 19.

The resin pouring pipe 16 connects to the resin injector 60 having the same configuration as the one in the above-described first embodiment. This allows the resin injector 60 to pour (supply) the resin 3 through the resin pouring pipe 16 and the runner 16*a* into the mold 10 (into the cavity) from the first gate 14*a* at the center. That is, the resin injector 60, the resin pouring pipe 16, and the runner 16*a* constitute a primary resin pouring mechanism (first resin pouring mechanism) for pouring the resin 3 into the mold 10 (into the cavity).

The resin pouring pipes 19 connect to the resin injectors 60 having the same configuration as the one in the above-described first embodiment. This allows the resin injectors 60 to pour (supply) the resin 3 through the resin pouring pipes 19 and the runners 19*a* into the mold 10 (into the cavity) from the second gates 14*b* at the opposite ends. That is, the resin injector 60, the resin pouring pipes 19, and the runners 19*a* constitute a secondary resin pouring mechanism (second resin pouring mechanism) for pouring the resin 3 into the mold 10 (into the cavity).

That is, in the present embodiment, the resin 3 is supplied to the first gate 14*a* at the center and the second gates 14*b* at the opposite ends through the separate resin pouring pipes 16, 19 (resin injectors 60), respectively.

[Method for Manufacturing a High-Pressure Tank]

The following describes the first resin pouring step (S206) and the second resin pouring step (S208) of FIG. 3 when the manufacturing device 1 having the above configuration is used to manufacture a high-pressure tank that is one example of the fiber reinforced resin molded article.

(First Resin Pouring Step: S206)

That is, after stopping (or completion of) the vacuum degassing, the control device 90 opens the valve 65 of the resin injector 60 connecting to the resin pouring pipe 16 at the center, pressurizes the base resin stored in the resin reservoir 62 with the pressure device 63, and pressurizes the curing agent stored in the resin reservoir 67 with the pressure device 68 to mix the base resin and the curing agent and prepare (uncured) resin 3. This lets the (uncured) resin 3 flow through the resin pouring pipe 16 that extends from the upper mold 12 to the lower mold 11, so that the resin 3 is injected/poured toward the preform 2 from the first gate (in the illustrated example, the gate at the central portion of the preform 2) 14*a* through the runner 16*a* (FIG. 10).

(Second Resin Pouring Step: S208)

If the control device 90 determines that the resin 3 injected/poured into the mold 10 has reached the opposite ends of the tank on the basis of pressure information (the pressure of the resin 3) obtained by the pressure sensors 13, the control device 90 opens the valves 65 of the resin injectors 60 connecting to the resin pouring pipes 19 at the opposite ends, pressurizes the base resin stored in the resin reservoirs 62 with the pressure devices 63, and pressurizes the curing agent stored in the resin reservoirs 67 with the pressure devices 68 to mix the base resin and the curing agent and prepare (uncured) resin 3. This lets the (uncured) resin 3 flow through the resin pouring pipes 19 that extend from the upper mold 12 to the lower mold 11, so that the resin 3 is injected/poured toward the preform 2 from the second gates (in the illustrated example, the gates at the opposite ends of the preform 2) 14*b* through the runners 19*a* (FIG. 11). At this time, the resin 3 poured from the first gate 14*a* and having reached the opposite ends of the tank (i.e., the positions corresponding to the second gates 14*b* located at the opposite ends of the tank) and the resin 3 poured from the second gates 14*b* meet (in the vicinity of the second gates 14*b*). Therefore, the method can control and reduce a resin meeting angle.

As described above, particularly in an elongated tank, to achieve high cycling by greatly reducing the resin meeting angle at the multiple gates and by greatly reducing the resin flow length, when directly pouring resin into the tank from the multiple gates, the present embodiment disposes the pressure sensors for detecting the resin flow at the ends of the tank to control the resin flow, so as to prevent formation of a weld line.

In addition, as in the above-described first embodiment, when placing the tank (preform 2) in the mold 10 and clamping the mold, a gap is kept between the lower mold 11 and the upper mold 12 to define a gap between the upper mold 12 and the tank (preform 2) to reduce the resin flow resistance during epoxy resin pouring, and only the first gate 14*a* of the runner 16*a* at the center of the tank is opened to make the resin flow from the center to the ends of the tank. At this time, if the pressure sensors 13 detect that the resin 3 has reached the ends of the tank, the second gates 14*b* at the opposite ends are opened to allow the resin 3 to meet, thereby reducing the resin meeting angle to prevent formation of a weld line. Thereafter, the upper mold 12 is closed and the inside of the tank is impregnated with the resin 3 under compression. In this manner, the present embodiment can prevent a weld line and reduce a void, and so can manufacture a product that ensures both the performance of the tank and the impregnation.

As in the first embodiment, this distributes the pressure applied to the gates during resin pouring, and also enables uniform pressure applied to the entire tank. This also prevents defects such as a weld line at the resin meeting portion and a void caused by the resin meeting. This also improves the resin impregnation in the stacking direction (thickness direction) while optimizing the flow behavior in the mold 10. This also allows impregnation with the resin 3 while feedback-controlling the pressure behavior in the mold 10. Uniformly pressing in the stacking direction (thickness direction) improves the resin impregnation and the quality of the tank surface. This second embodiment is particularly effective when the length of the tank and the resin flow length are long, and a plurality of resin injectors are needed.

In this way, as in the first embodiment, when epoxy resin is impregnated by the RTM impregnation technology, the present embodiment can reduce a weld line and a void, and can also make the pressure over the entire tank uniform and low to impregnate the epoxy resin, and so can manufacture a tank that ensures both the performance of the tank and the impregnation.

As described above, according to this second embodiment, as in the above-described first embodiment, the resin 3 is poured from the second gates (second resin inlets) 14b when the resin flow is detected at the second gates (second resin inlets) 14b, and then the resin 3 poured from the first gate (first resin inlet) 14a and the resin 3 poured from the second gates (second resin inlets) 14b are made smoothly meet, so even with multiple gates (resin inlets), the second embodiment can reduce the meeting angle of the resin 3 to prevent a weld line.

In addition, by providing the plurality of resin pouring pipes 16, 19 (resin injectors 60) corresponding to the first gate (first resin inlet) 14a and the second gates (second resin inlets) 14b, the present embodiment can keep the impregnation with the resin 3 uniform even if the preform 2 is larger in size.

Modification of the First and Second Embodiments

It should be noted that in the above-described first and second embodiments, the direction in which the resin 3 is poured (ejecting direction) from the second gates (second resin inlets) 14b is set substantially perpendicular to the axial direction of the preform 2 (or the liner thereof). This allows the resin 3 poured from the first gate 14a into the mold 10 and having reached the opposite ends of the tank (i.e., the positions corresponding to the second gates 14b located at the opposite ends of the tank) and the resin 3 poured from the second gates 14b into the mold 10 to meet substantially perpendicularly to each other in the vicinity of the second gates 14b.

Figure 12:
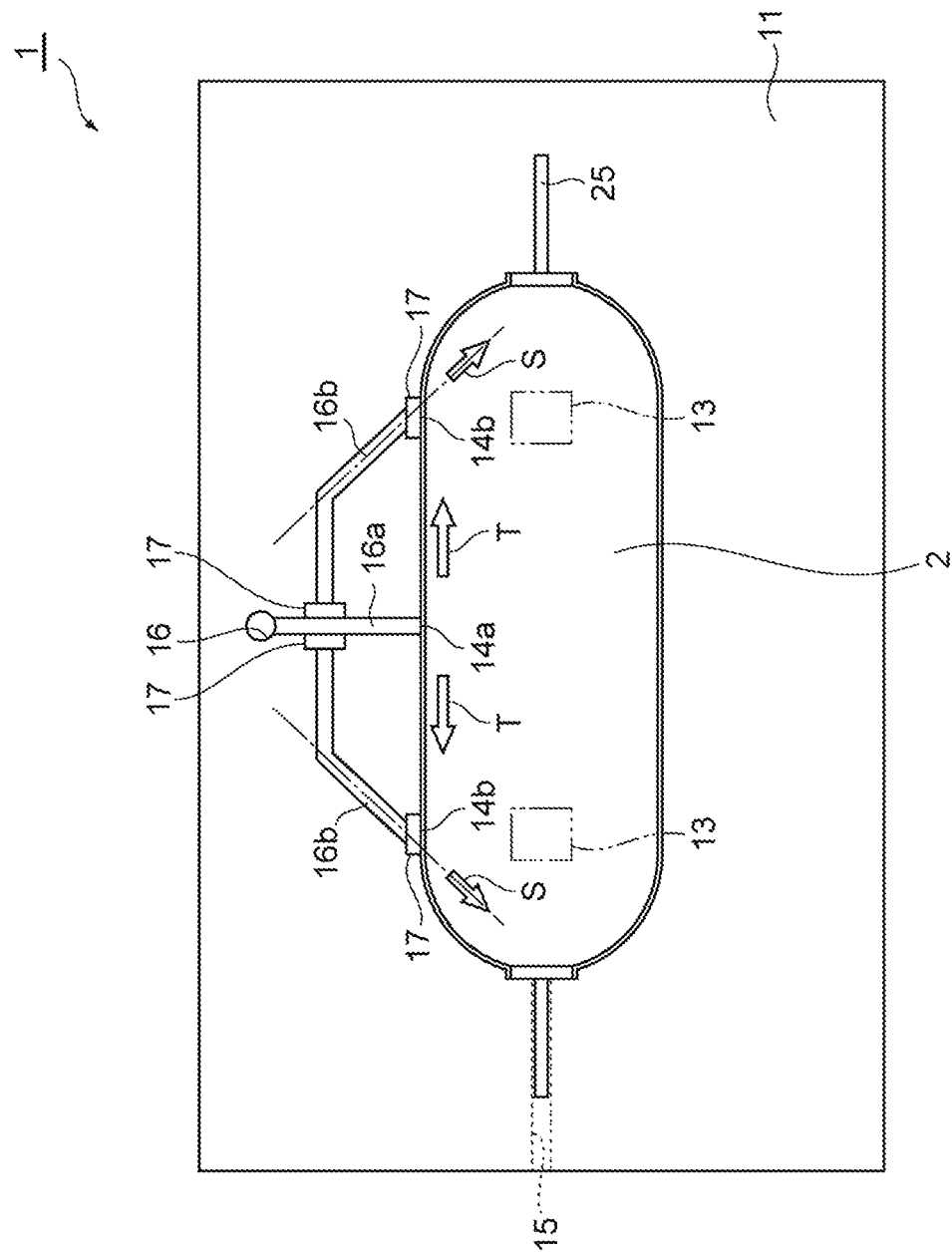
FIG. 12 is a top view of the lower mold of another example of the manufacturing device of a high-pressure tank, in which the upper mold is removed.
Figure 13:
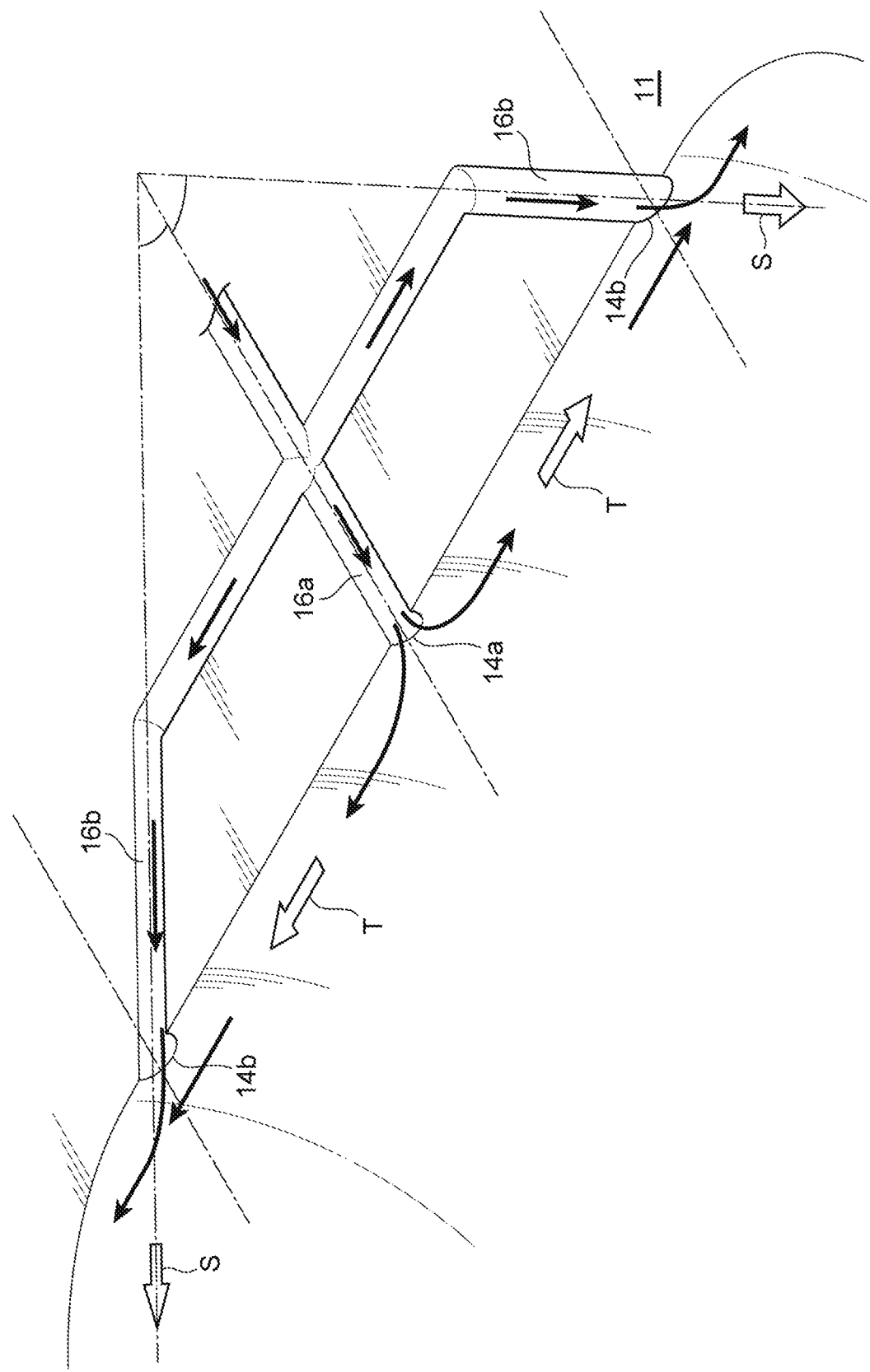
FIG. 13 is an enlarged perspective view of a main part of FIG. 12.

Meanwhile, as shown in FIG. 12 and FIG. 13, the direction in which the resin 3 is poured (ejecting direction) (arrow S direction) from the second gates (second resin inlets) 14b is made inclined with respect to the axial direction of the preform 2 (or the liner thereof), more specifically, made inclined in the direction (arrow T direction) from the first gate (first resin inlet) 14a toward the second gates (second resin inlets) 14b, and the resin 3 poured from the first gate 14a into the mold 10 and having reached the opposite ends of the tank (i.e., the positions corresponding to the second gates 14b located at the opposite ends of the tank) and the resin 3 poured from the second gates 14b into the mold 10 are made meet with inclination in the vicinity of the second gates 14b. This can further reduce the resin meeting angle in the vicinity of the second gates 14b, and make the resin 3 poured from the first gate 14a into the mold 10 and having reached the opposite ends of the tank (i.e., the positions corresponding to the second gates 14b located at the opposite ends of the tank) and the resin 3 poured from the second gates 14b into the mold 10 meet even more smoothly in the vicinity of the second gates 14b.

It should be noted that to facilitate understanding, FIG. 13 omits the open/close gate cores 17 and the preform 2 and shows the flow (direction) of the resin 3 by solid line arrows.

That is a detailed description of the embodiments of the present disclosure referring to the drawings. The specific configuration of the present disclosure is not limited to the above-stated embodiment, and the design may be modified variously without departing from the spirits of the present disclosure. The present disclosure covers such modified embodiments.

DESCRIPTION OF SYMBOLS

1 Manufacturing device of high-pressure tank (fiber reinforced resin molded article)
2 Preform
3 Resin
4 High-pressure tank (fiber reinforced resin molded article)
10 Mold
11 Lower mold (first mold)
12 Upper mold (second mold)
13 Pressure sensor (detecting unit)
14a First gate (first resin inlet)
14b Second gate (second resin inlet)
15 Vacuum degassing pipe (vacuum degassing mechanism)
16 Resin pouring pipe (first and second resin pouring mechanisms)
16a Runner (first resin pouring mechanism)
16b Branch runner (second resin pouring mechanism)
17 Open/close gate core
19 Resin pouring pipe (second embodiment)
19a Runner (second embodiment)
20 Transfer mechanism
25 Shaft
30 Driving mechanism
40 Temperature controller
50 Vacuum pump (vacuum degassing mechanism)
60 Resin injector (first and second resin pouring mechanisms)
61, 66 Resin storage
62, 67 Resin reservoir
63, 68 Pressure device
65 Valve
90 Control device

What is claimed is:

1. A method for manufacturing a fiber reinforced resin molded article, the method including forming a preform including a fiber layer on an outer surface of a liner, impregnating the fiber layer of the preform with resin, and curing the resin, comprising:
   a step of preparing a mold including a first resin inlet, a second resin inlet, and a detecting unit for detecting resin flow inside of the mold;
   a step of placing the preform in the mold;
   a step of pouring resin from the first resin inlet into the mold; and
   a step of pouring resin from the second resin inlet into the mold when the detecting unit detects that the resin poured from the first resin inlet has reached the second resin inlet and allowing the resin poured from the first resin inlet and the resin poured from the second resin inlet to meet, wherein the mold includes a first mold and a second mold;

in the step of placing the preform in the mold, the preform is placed between the first mold and the second mold so as to define a first gap between the first mold and the preform and a second gap between the second mold and the preform, the second gap being larger than the first gap;

in the step of pouring resin from the first resin inlet into the mold and the step of pouring resin from the second resin inlet into the mold, the resin is poured toward the second gap in the mold; and the method further comprises, after the step of pouring resin from the first resin inlet into the mold and the step of pouring resin from the second resin inlet into the mold, a step of bringing the second mold close to the preform for compressive filling with the resin in the mold.

2. The method for manufacturing a fiber reinforced resin molded article according to claim 1, wherein the detecting unit includes a pressure sensor configured to detect pressure of resin flowing in the mold.

3. The method for manufacturing a fiber reinforced resin molded article according to claim 1, wherein the first resin inlet is located at a position closer to a center of the preform as compared to the second resin inlet.

4. The method for manufacturing a fiber reinforced resin molded article according to claim 1, wherein an injection direction of the resin at the second resin inlet is inclined in a direction from the first resin inlet toward the second resin inlet.

5. The method for manufacturing a fiber reinforced resin molded article according to claim 1, wherein resin is supplied to the first resin inlet and the second resin inlet from a common resin injector.

6. The method for manufacturing a fiber reinforced resin molded article according to claim 1, wherein resin is supplied to the first resin inlet and the second resin inlet from separate resin injectors, respectively.

7. The method for manufacturing a fiber reinforced resin molded article according to claim 1, wherein the resin includes a thermosetting resin.

* * * * *